United States Patent [19]
Sirven

[11] 3,896,434
[45] July 22, 1975

[54] PULSE TYPE RADAR SYSTEM

[75] Inventor: Jacques Sirven, Paris, France

[73] Assignee: Thomson-CSF, Paris, France

[22] Filed: Mar. 4, 1974

[21] Appl. No.: 448,011

[30] Foreign Application Priority Data
Mar. 6, 1973 France .............................. 73.07933

[52] U.S. Cl. .......................... 343/5 SA; 343/17.1 R
[51] Int. Cl. .............................................. G01s 9/02
[58] Field of Search ......... 343/5 SA, 17.1 R, 17.2 R

[56] References Cited
UNITED STATES PATENTS

| | | | |
|---|---|---|---|
| 3,715,509 | 2/1973 | Dawson | 343/5 SA X |
| 3,716,823 | 2/1973 | Thompson et al. | 343/5 SA X |
| 3,719,945 | 3/1973 | Sletten et al. | 343/5 SA X |
| 3,772,689 | 11/1973 | Root, Jr. | 343/5 SA X |

Primary Examiner—T. H. Tubbesing
Attorney, Agent, or Firm—Edwin E. Greigg

[57] ABSTRACT

The present invention relates to a radar system haing a high range resolution. Said radar system emits series of n pulses whose carrier frequencies are distributed within a band B and whose time positions are associated with the frequency in accordance with a linear reelationship. The echoes received in return are demodulated with the corresponding waves which gave rise to them, and supplied to a filter bank which produces at different outputs, different signals which correspond to separate objects or parts of objects.

8 Claims, 4 Drawing Figures

PULSE TYPE RADAR SYSTEM

BACKGROUND OF THE INVENTION.

The present invention relates to pulse-type radar systems. It relates more particularly to radar systems having high range resolution.

The concept of resolution is defined as the ability to detect separately, that is to say to distinguish from one another, two objects which are very close together. The range resolution is the minimum distance separating two separately detected objects, and is normally referred to as "minimum recognisable separation".

According to P. M. Woodward: "Probability and Information Theory with application to Radar", edited by McGraw Hill, the range resolution is inversely proportional to the spectral width of the transmitted and received signal, and this depends upon the pass band of the overall system.

In certain known systems, a substantial spectral width is obtained by emitting very short pulses (Modern Radar pages 195–197, Berkowitz, edited by Wiley). In other known systems, long pulses are emitted but they are linearly frequency modulated within a wide frequency band (Berkowitz pages 108 and 209).

By way of example, if it is desired to reduce the range resolution to values in the order of one metre, the signal being processed must have a spectral width of 150 megahertz. Receivers and processing circuits which operate within a very wide frequency band are required and their design then becomes highly complex. In particular, numerical processing of the signal requires extremely fast signal coding. For a signal having a spectral width of 150 megahertz, the sampling of the signal which is to be encoded, must be effected at intervals of no more than three nanoseconds. Coding at this kind of rate is at the present time an extremely tricky matter. The limits of the range resolution of known radar systems are always determined by the performances of the circuits used.

The radar system in accordance with the invention does not suffer from these drawbacks. Its makes it possible, in particular, to obtain a very high range resolution with emitted signals having a substantial spectral width, whilst utilising at the receiving end circuits which operate with a reduced pass band.

SUMMARY OF THE INVENTION

In accordance with one feature of the invention, there is provided a radar system having a high range resolution, comprising means for emitting a series of n pulses whose carrier frequencies are distributed within a band B and whose time positions are associated with the frequency in accordance with a linear relationship, said series of pulses being repeated with a given recurrence periodicity, means for receiving the echo signals from objects in space and for effecting demodulation using the corresponding waves which gave rise to them, means for supplying each series of demodulated echoes to a bank of filters for producing at different outputs, different signals which correspond to separate objects.

Two objects in space are thus separately detected when the corresponding output signals from the filter bank appear at two separate outputs designated by their order, the distance separating said objects being proportional to the difference between said orders.

In accordance with another embodiment of the invention, the emitted pulses are regularly spaced in time and the carrier frequencies of the pulses are regularly distributed within the band B. The relationship linking the frequency and the position of each pulse, being a linear one at the time of emission, at the receiving end an analogue or a digital filter bank is provided. In the event that a digital filter bank is used, such as a spectral analyser of the kind employing a Fourrier transform computing circuit, the order of emission of pulses may be modified. The linear frequency-position relationship is restored by consequently modifying the order in which the signals received and stored are extracted by the computer, that is to say by modifying the computing programme.

To obtain a given range resolution, the frequency band required is therefore divided up into n equal parts and each of the pulses emitted has this fraction of the necessary band as its spectral width. Thus, for each pulse the spectral width of the emitted and received signal is small if n is large.

By way of example, using conventional circuits at emission and reception ends, the system in accordance with the invention can readily distinguish two objects 30 centimetres apart, the pass band of the signal processing circuits then only being in the order of 1 megahertz.

BRIEF DESCRIPTION OF THE DRAWINGS.

Other features of the invention, the principle of which will be explained hereinafter, will become apparent from the ensuing description which is illustrated by the figures where.

Figure 1:
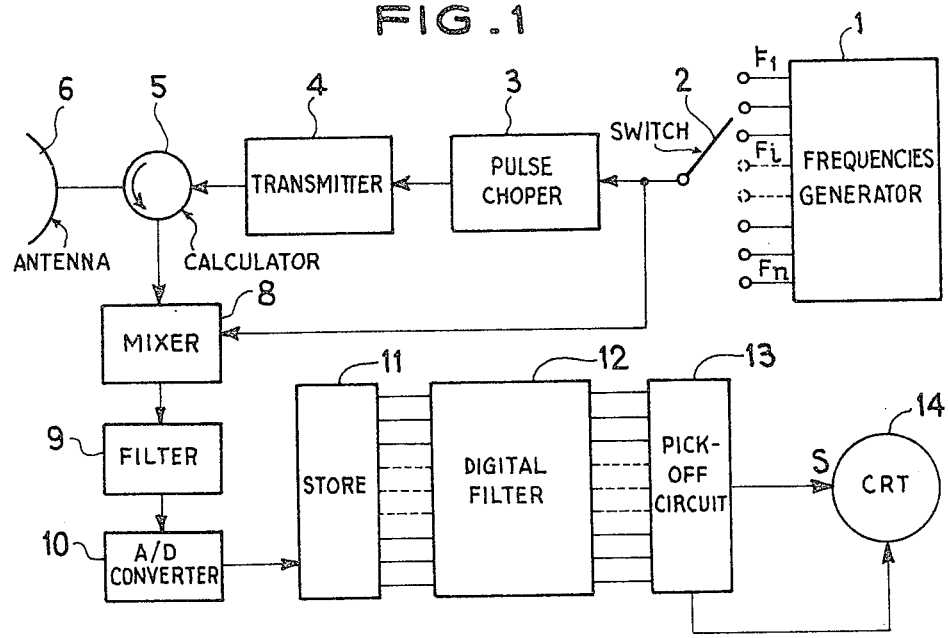
FIG. 1 is a simplified block diagram of the system in accordance with the invention.

DESCRIPTION OF THE INVENTION.

In any kind of radar, the range resolution $\Delta D$ is associated with the spectral width B of the signal emitted and received, by the relationship:

$$\Delta D = \frac{c}{2B}$$

where $c$ is the velocity of light.

Instead of emitting a signal within a wide frequency band for each pulse, the system emits the signal with the help of a series of n successive pulses, n being a whole number greater than one and each pulse in the series having a reduced spectral width. The frequency band required to achieve the desired range resolution, is split into n equal parts distributed over said n pulses. The system thus emits a recurrent series of n pulses regularly spaced in time and having carrier frequencies regularly spaced within the frequency band B. The spectral width of each pulse in the series can be reduced to the nth part of the bandwidth B.

At reception, the received signal will be demodulated by the wave which produced it, that is to say by the wave from which each pulse is chopped.

The pass band of the video frequency signal which it is required to process in the receiver circuits, is thus reduced to the value B/n.

Considering a single fixed object located at a range $x$ from the radar, the phase difference $\phi$ between an emitted signal and the received echo signal is proportional to the range $x$ and to the frequence F of the emitted signal, as follows:

$$\phi = 2\pi F \frac{2x}{c}$$

$c$ being the velocity of light.

Let F1, F2, ... Fn be the carrier frequencies of n pulses emitted in a series. From one pulse to the next, the carrier frequency varies by a quantity $\Delta F$ which is constant and may be positive or negative. Whatever the order $i$ of a pulse in the series, the following conditions holds $$\Delta F = F_{i+1} - F_i$$

$F_i$ and $F_{i+1}$ being respectively the carrier frequencies of the pulses of order $i$ and $i+1$.

Let $\phi 1, \phi 2, \ldots \phi n$ be the phase intervals when each received pulse is demodulated by the wave which produced it.

From one received pulse to the next, this phase difference will vary by the amount:

$$\Delta \phi = 2\pi \Delta F \frac{2x}{c}$$

which amount is independent of the order i of the pulses. The frequency interval $\Delta F$ being defined at constant, this amount depends linearly upon the range $x$.

Thus, after demodulation the video signal corresponding to an object in space is constituted by a series of n recurrent signals whose phase varies from one to the next by the quantity $\Delta \phi$.

The signals thus constitute samples of a sinusoidal function whose frequency $f$ depends upon the range $x$ of the object or target. If $Tr$ is the recurrence periodicity of the pulses:

$$f = \frac{\Delta F}{Tr} \cdot \frac{2x}{c}$$

A first object at range $x1$ is characterised by a sinusoidal function of frequency $f1$, a second object at range $x2$ by a sinusoidal function of frequency $f2$. Sinusoidal functions of this kind are displayed in the radar with the help of a circuit which filters the video signal and, preferably, with the help of a digital filtering circuit or, and this comes down to the same thing, a circuit for computing the Fourrier transform of the video signal.

At the input of the Fourrier computing circuit, the signal takes the form of a series of samples regularly spaced in time. It thus produces at its output the power spectrum of the input signal. To do this, it is provided with a large number of outputs equivalent to the outputs of a similar number of narrow band-pass filters with regularly distributed centre frequencies.

The separation of two objects is space located at neighbouring radial ranges $x1$ and $x2$, is equivalent to the separation between the two corresponding frequencies $f1$ and $f2$. The difference between the frequencies, $f2 - f1$, is proportional to the difference between the ranges, $x2 - x1$. The range resolution thus comes down to a matter of frequency filtering and this is an operation which can be carried out with high accuracy.

FIG. 1 illustrates a simplified block diagram of a radar system in accordance with the invention. The nature of the circuits in this figure will be specified at a later point. The system comprises a generator 1 producing n waves of frequencies F1, F2, ... Fi, ... Fn, regularly spaced and distributed within a given frequency band B. A switch 2 successively and cyclically selects the frequencies Fi. A circuit 3 chops a pulse of given duration from each wave. These pulses are subsequently emitted by a transmitter 4, a circulator 5 and an antenna 6.

At the receiving end, the waves reflected by one or more objects are picked up by the antenna 6 and directed to the receiver through the circulator 5. The simplified receiver comprises a mixer 8 which, on the one hand, receives the received signal, and, on the other hand, the signal from the generator 1, which was responsible for producing it in the first place. The video signal produced by the mixer 8 is successively fed through a filter 9 whose pass-band is matched to that of the pulses, a digital coding circuit 10, that is to say an analogue-digital converter, a storage circuit 11, a digital filtering circuit 12 and an extraction circuit 13. The output signal, appearing at a terminal S, is then processed by the user who may either display it upon the screen of a cathode ray tube 14 or record it etcetera, etcetera. The utilizing circuit 14 is synchronized by the extraction circuit 13.

The operation of the system is as follows: the $n$ pulse carrier frequencies are produced by the generator 1 at its n outputs. The switch 2 successively moves to each of the n outputs for a time Tr. During said time Tr, the circuit 3 chops out a pulse of given duration. This pulse is produced at the beginning of the period Tr so that during the remainder of the period the signal selected by the switch 2 can be used to demodulate in mixer 8 the echo signal received from an object. The duration of the pulse is such that the spectral width is at least equal to B/n. Each pulse in a series is produced in the same fashion.

Figure 2:
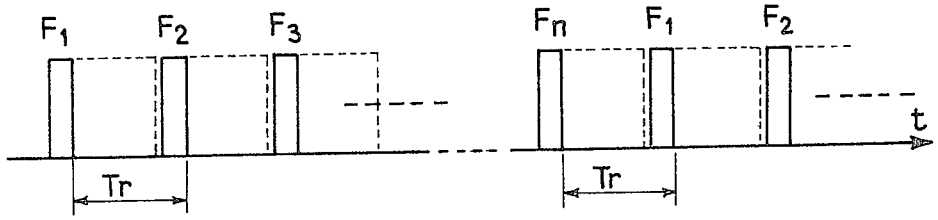
FIG. 2 is an example of the form of the emitted waves.

FIG. 2 illustrates as a function of time, the form of the emitted signal. This signal is a repetitive sequence of n pulses of frequencies F1, F2, ... Fn; the pulse of frequency F1 in a series, is emitted after the last pulse in the preceding series, and in fact after the same time interval Tr.

At reception, the received signal is demodulated by the wave which first produced it, that is to say by the corresponding signal from the generator 1.

The sequence of processing of the output video signal from the mixer 8, is a conventional one. A filter 9 whose passband is matched to the spectral width of each pulse, eliminates all signals not demodulated by the wave which has produced them. The signals are then fed into a conventional digital filter 10, 11, 12, 13.

The samples of the sinusoidal function, after digital coding, are stored in the storage circuit 11 until the $n$ samples have been collected.

The digital filter bank 12 is an element which computes the Fourier transform of the input signal. This is a computer programmed in accordance with an algorithm known as a fast Fourrier transform. It comprises, therefore, n inputs supplied with the n successive samples corresponding to the same pulse train, and n outputs. Such a digital filter bank is more completely described on pages 35-14 to 35-17 of McGraw Hill's Radar Handbook.

Each output produces a signal whose amplitude represents the power of an echo of given frequency or, more correctly, within a small band of given frequencies.

If the computer input receives $n$ samples at a recurrence periodicity of Tr, the outputs will produce $n$ signals and the frequency interval between two consecutive outputs will be $1/n$Tr. The presence of an object at a range $x$ from the radar is characterised by $n$ samples of a sinusoidal function of frequency $$f = \frac{\Delta F}{Tr} \cdot \frac{2x}{c}$$

The range resolution of the radar is $\Delta D$. Two objects will be separately discerned if the corresponding sinusoidal functions are detected at two separate outputs and at a minimum at two consecutive outputs of the digital filter, between which the frequency interval is $$\Delta f = \frac{1}{nTr}$$

the range interval $\Delta D$ between two objects thus being represented by a frequency interval between the sinusoidal functions, of $$\Delta f = \frac{\Delta F}{Tr} \cdot \frac{2 \Delta D}{c}$$

The equality of these two relationships, results in $$\Delta D = \frac{c}{2n \, \Delta F}$$

$\Delta F$ being the interval between the frequencies of two consecutively emitted pulses, $n\Delta F$ being equal to the total frequency bandwidth $B$, so that $$\Delta D = \frac{c}{2B}$$

which is the definition of the range resolution of any radar system.

The signals appearing at the n outputs of the filter 12 are successively picked-off by the circuit 13 which may be a simple switch. The output signal at S then takes the form of a series of $n$ digital signals which represent the appearance of a block of space.

In reality, the block of space observed has the dimension $n \, \Delta D$ and is very small in relation to the detecting capability of the radar and in relation to the range $x$ of the object. It is therefore necessary to eliminate all those received signals which do not relate to this block of space.

This function is partially achieved at the time of demodulation in the mixer 8.

After the emission of a pulse, in order for an object in space to be detected it is necessary that the go and return times of the waves between the radar and the object should be shorter than Tr which is the recurrence periodicity of the pulses. In this case, the received signal can be demodulated by the wave which produced it. The signal required for this demodulation operation and applied to the mixer 8, is taken from the output of the switch 2 as indicated in FIG. 1.

If, the go and return time is longer than Tr, the received signal is demodulated by a wave other than the one which produced it and will subsequently be eliminated by the filter 9. The range span containing the only objects visible, is thus equal to $$\frac{cTr}{2}.$$

To detect an object at a range greater than this value, it is necessary to know the approximate range of the object, that is to say to know whether it is between $$k \frac{cTr}{2} \text{ and } (k+1) \frac{cTr}{2},$$

where $k$ is a whole number between 0 and $n-1$. Knowing the number $k$ from the appproximate range of the object being observed, the range span containing the object will be rendered detectable by the radar by picking off that demodulation signal from the outputs of the generator 1, whose order is displayed by k in relation to the position of the switch 2.

For this purpose, a second switch ($k2$ visible in FIG. 3) is used, operated synchronously with the switch 2 but with an offset of order $k$.

The range span containing the sole objects which are visible still remains equal to $1/2cTr$. The radar is blind with respect to objects located beyond this range span.

Since this range span is generally still very much larger than the block of space $n\Delta D$, the system must furthermore contain a range gate, that is to say a circuit which only transmits the received signal during a given period of time and thus eliminates all echos arriving prior to and after the closing of the gate. It is possible for example, to use a logic gate arranged between the coding circuit 10 and the store 11, or an analogue gate placed between the filter 9 and the coding circuit 10.

The instants at which the gate opens and closes, are defined, respectively, by the start and end of the range span which is to be swept.

Figure 3:
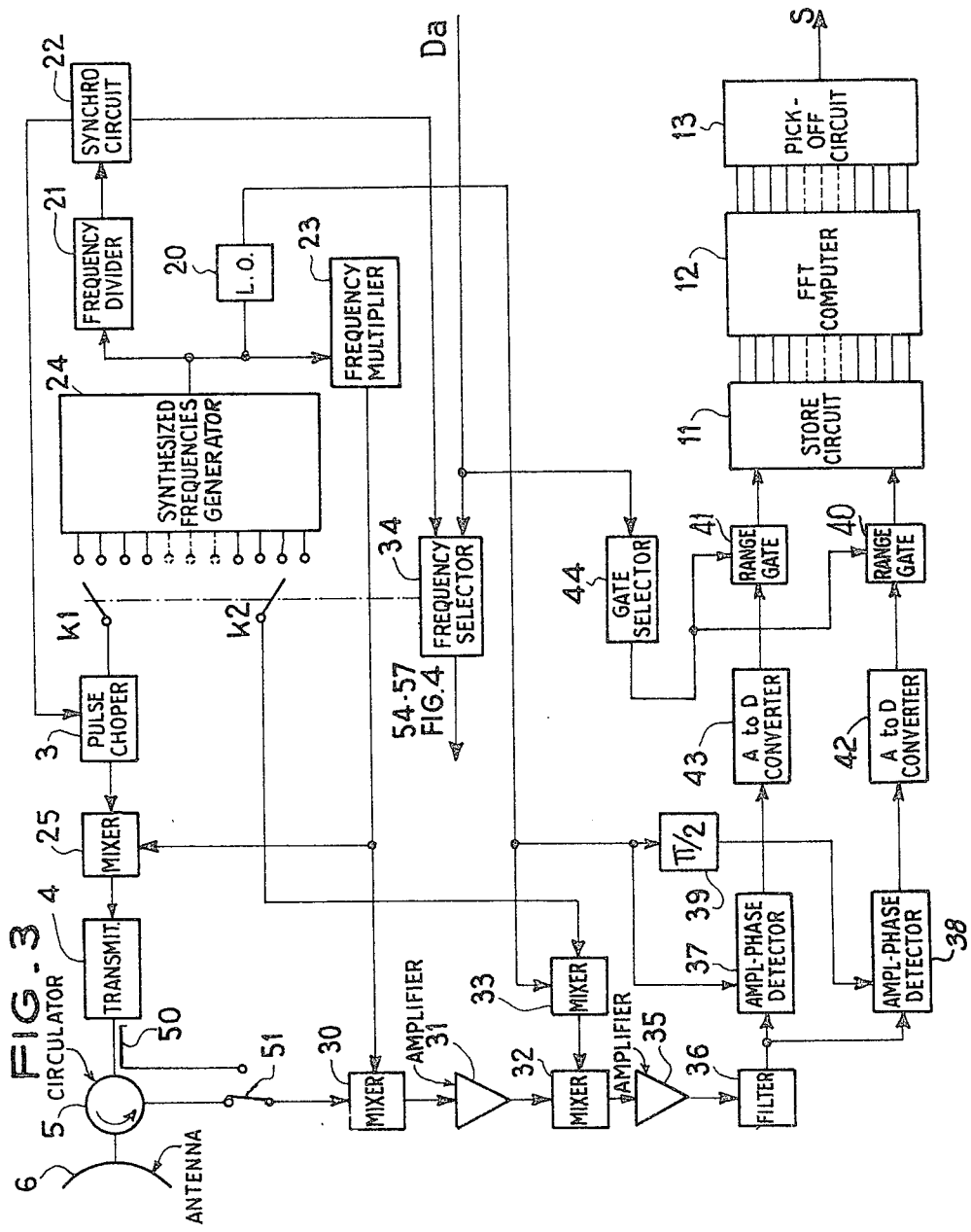
FIG. 3 is an example of a complete radar system according to the invention.

On the basis of an approximate indication of the range of the object or objects being observed, it would be possible to use a control circuit to control the operation of the range gates (circuit 40,41; FIG. 3). Self-evidently, the control signals are supplied at the same instant in each recurrence during the reception of one and the same echo series. To cover a wider range span, the instant of opening and closing of the gate can be shifted from one series of pulses to the next. The time required for the observation of a larger span is longer since it requires several pulse series.

FIG. 3 illustrates a preferred example of a complete radar system. It comprises circuits identical to those shown in FIG. 1 which latter was purely an explanatory diagram. These circuits will be marked by the same references used there.

The emission part comprises a stable local oscillator 20; the oscillator is followed by a series of frequency dividers 21 and a synchronisation control circuit 22 through which the general synchronising of the radar is effected. The oscillator 20 is also connected to a series of frequency multipliers 23 which furnish the high frequency carrier wave and to a synthesized frequency generator 24 supplying the n separate frequencies distributed within the band B. This generator 24 can be constituted by an arrangement of $n$ mixer circuits and a series of frequency dividers producing, from the wave of frequency F furnished by the oscillator 20, the frequencies $\Delta F, 2\Delta F, \ldots n\Delta F$, $\Delta F$ being the frequency interval between two successive outputs of the generator. Each of the mixers is supplied on the one hand with the wave of frequency F and one of the waves of frequency $\Delta F, 2\Delta F, \ldots n\Delta F$. The mixers are followed by a filter and produce waves of frequencies $F + \Delta F, F + 2\Delta F, \ldots F + n\Delta F$. The outputs are connected cyclically to a pulse choper circuit 3 by means of a n-position switch K1.

A second switch K2 identical to K1 connects one of these outputs to the demodulation circuits of the receiver.

The switches K1 and K2 are controlled by a control circuit 34 known as a "frequency selector", in accordance with the synchronising signals from the circuit 22 and with an approximate range indication D$a$ (range of the object being observed or of the block of space to be observed) which makes it possible to define the difference in order between the positions of the two switches. This range indication can be furnished by an associated measuring system or can be fed in manually by a system user. The control circuit 34 produces signals which control the step-by-step advance of the switches K1 and K2. It comprises dividing means for determining the whole number $k$ which is the whole integer part of the quotient $2Da/cTr$. The circuit 34 then controls the switch K2 with a shift of $k$ positions in relation to the switch K1.

The choper circuit 3, from the signal applied to its input, chops pulses in accordance with control signals issuing from the circuit 22. It is constituted for example by an analogue gate or a two-position switch, one of the two positions corresponding to transmission of the signal and the other to signal inhibition. The chopper 3 is followed by conventional transmitter circuits, namely a mixer 25 connected to the frequency multiplier 23, a transmitter 4, a circulator 5 and an antenna 6.

At the receiving end, the system comprises conventional frequency changer circuits. After the antenna and the circulator, it incorporates a mixer 30 likewise connected to the frequency multiplier 23 and producing a first frequency change, a wide-band amplifier 31 and a second frequency changer comprising mixers 32 and 33. The mixer 33 is connected on the one hand to the switch K2 and on the other to the oscillator 20. The mixer 32 is connected to the output of the amplifier 31 and the output of a mixer 33.

The mixer 32 is followed by an amplifier 35 associated with a filter 36 whose pass band is matched to that of the pulses and centred on the frequency F.

The detecting and filtering circuits for the received signal comprise two amplitude-phase detectors 37-38 supplied in quadrature by the oscillator 20 and through a phase-shift circuit 39 producing a 90° phase-shift respectively; two analogue-digital converters 42 and 43; two range gates 40 and 41 controlled by a circuit 44 called a "gate selector circuit"; a buffer store circuit 11 with $n$ outputs; a unit 12 with $n$ channels, for calculating the fast Fourrier transform; a pickoff circuit 13; and an output terminal S.

The computer circuit 12 uses signals which are in quadrature, the calculations being performed in the complex plane. The input and output channels therefore number two. The storage circuit 11 has $2n$ outputs and the pick-off circuit has $2n$ inputs. The computer circuit 12 has $2n$ inputs and $2n$ outputs, an operating store, and output store and a programmed computer element. It can therefore treat the whole of the signals received during the $n$ recurrences, en bloc. Each pair of outputs furnishes two signals which are the components of a vector whose amplitude represents the power of the echo at the frequency in question. The pick-off circuit 13 is constituted by an electronic switch which successively selects the output signals from the computer 12, at a given rate, and by a circuit for computing vector module. The range gates 40–41 can be associated with the A/D converters 43 and 42 which take the form for example of circuits for zeroing the output signals from the converter when the gate is not open. The gate selector circuit 44 can then be constituted by analogue or digital timer circuits controlled in accordance with the approximate range indication D$a$. For example, the circuit 44 may comprise a divider which determines the remainder of the division $2Da/cTr$ in the form of an analogue signal, a sawtooth generator synchronised with the emission of each pulse and a coincidence detector which produces a pulse of given duration when the amplitudes of the output signals from the divider and the sawtooth generator, are identical. The duration of the pulses controlling the range gates is substantially equal to $\Delta D/c$.

The operation of the system is identical to that of FIG. 1.

The $n$ frequencies of the pulses are produced by the arrangement of oscillator 20, synthesiser 24 and frequency changer 25.

The form of the pulses is defined by the chopper circuit 3 in accordance with the synchronisation signals of the synchro circuit 22.

At the receiving end, the frequency change taking place in the mixer 30 converts the frequencies to those at the synthesiser output. Demodulation is effected in two stages: The set of mixers 32 and 33 supplied by the oscillator 20 and the synthesiser via K2, brings all the pulse frequencies to F, this being the frequency of the oscillator 20.

The signals corresponding to objects outside the range span being observed, are eliminated by the filter 36, and final detection is carried out by the detectors 37 and 38. The output signal at S can be displayed directly upon the screen of a cathode ray tube, the horizontal deflection being proportional to the amplitude of the signal and the vertical deflection being linear and synchronised with the picking off of the output signals from the computer 12.

By way of indication, in order to achieve a range resolution of 30 centimetres, the system has to emit series of 500 pulses having lengths of 0.5 microsecond. The recurrence periodicity of the pulses is 10 microseconds, and the complete cycle therefore lasts 5 milliseconds. The band of frequencies required is 500 megahertz and the pulses are frequency staggered at 1 megahertz intervals.

The circuit for computing the Fourrier transform comprises 500 double outputs. The frequency shift between two consecutive outputs is 200 hertz. The maximum range span which can be covered with each pulse series, is 150 metres, this is reduced to 75 metres by the range gates in order to give clean ends. An offset of $k$ orders between the switches K1 and K2 defines a range span of 1.5 kilometres located a $k \times 1.5$ kilometres from the radar.

Figure 4:
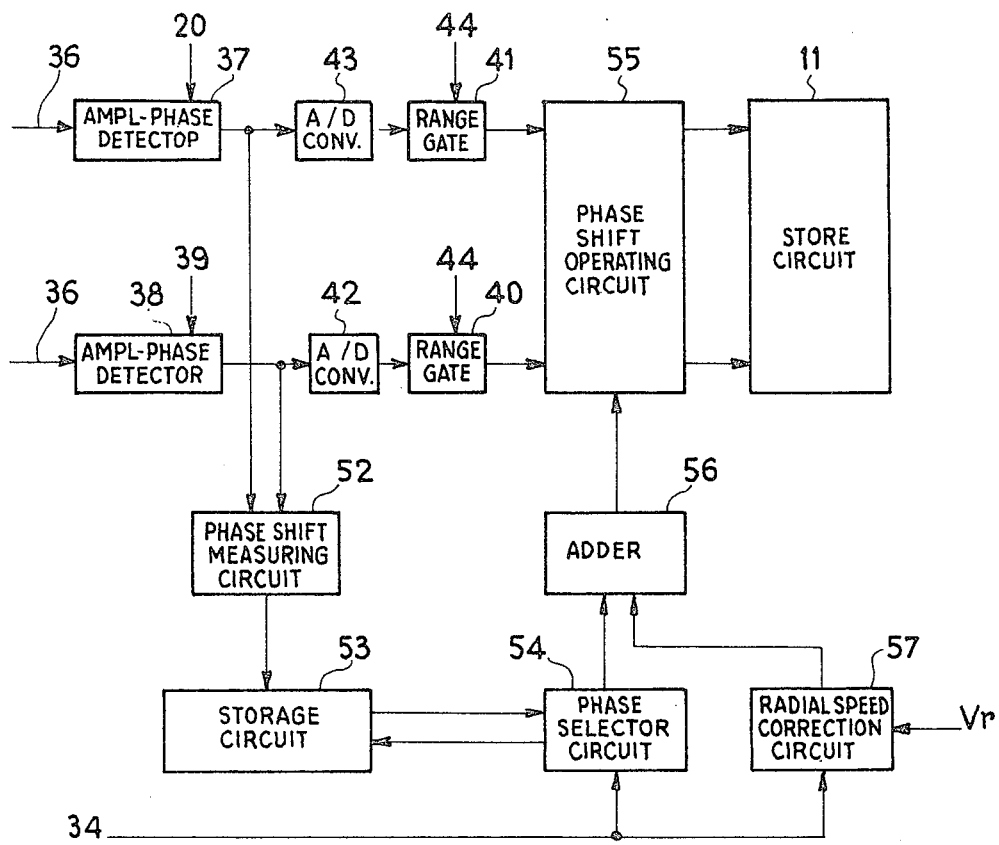
FIG. 4 is a diagram of improved digital processing circuits.

FIG. 4 illustrates the diagram of an improved digital processing circuit. The part of the receiver comprising the amplitude phase detectors 37–38, the A/D converters 42–43, the range-gates 40–41 and the store circuit 11 has only be reproduced.

The variations in carrier frequency of the pulses are responsible for variations in the propagation time of the signals in particular through the transmitter 4.

To compensate it is necessary to simulate echos from an object at zero range by transmitting a series of pulses directly from the transmitter to the receiver. A coupling element 50 is provided (FIG. 3) between the transmitter 4 and the circulator 5, associated with a switch 51 between the circulator and the mixer 30.

The variations in propagation time at emission are translated, at reception, into terms of unwanted phase-shifts which must be measured, stored and subtracted from the phaseshift values obtained in normal operation.

A circuit 52 (FIG. 4) for measuring phase-shifts comprises two inputs connected respectively to the outputs of the two amplitude phase-detectors 37 and 38, and an output connected to a storage circuit 53. The control of the measuring circuit 52 as well as of the switch 51 has not been illustrated; this control may be manual in nature. The storage circuit 53 can be an n-1 position shift register, the shift junction being controlled by the radar synchronising signals or by the signals which control the switches K1 and K2 and are furnished by the circuit 34.

A phase-shift operating circuit 55 is arranged between the storage circuit 11 and the output of the range gates 40 and 41. The two input signals to this operating circuit or operator, represent the components of a vector. The circuit 55, at its output, furnishes two other signals representing the components of another vector having the same modulus as the input vector but whose orientation in relation to a reference datum is modified by a given angle. This angular value or phase-shift angle is extracted from the store 53 and applied to the operator 55 through the medium of a selector circuit 54 and an adder 56. A second phase-shift angle value is likewise applied to the adder 56 by a circuit 57 effecting a radial speed correction. The two circuits 54 and 57 operate in accordance with control signals from the circuit 34.

The operator 55 takes the form of a computer circuit comprising for example a wired programme. It is possible to use a digital or analogue computer if the latter is arranged before the digital coding circuits. The phase selector circuit picks-off the phase-shift values which have been stored, in order to apply them successively to the operator 55 at the start of each recurrence.

These phase-shift values are produced in the following manner:
On reception of the first pulse from the emitter directly the output signals from the two detectors 37 and 38, representing the components of a vector V1 in a rect- angular resolution system, are stored in the circuit 52. On reception of the next pulse and until the last in the pulse train, the output signals from the two detectors represent the components of the vectors V2, V3, ... Vn which are compared with those corresponding to the first pulse. From the second pulse onwards and up to the last, the circuit 52 supplies a signal which is a function of the angle between the vector V1 and each vector V2, ... and Vn which angular value is stored in 53 and applied to 55 during normal operation of the system. Instead of comparing the vectors V2 to Vn with the vector V1, the circuit 52 could equally well compare the vectors V1 to Vn with an appropriate reference seeing that said reference is the same for all the vectors.

The circuit 57 effects a phase correction in the case of moving objects. In this case, the phase correction to be applied must be proportional to the radial speed of the object and to the square of the order of the pulse received. The circuit 57 is therefore a computer circuit which received an indication of the radial speed Vr of the object from an associated measuring system which has not been shown and which supplies to the operator a series of phase-shift values which are added by the adder 56 to those in the compensating circuits 52-53-54. The system is then once again in the condition of observing fixed objects.

It is possible, however, to dispense with the correcting circuit 57 in the case where the displacement of the object, during the time of emission of a series of pulses is less than the range resolution $\Delta D$ of the system.

In the system which has been described, the pulses emitted had carried frequencies and time positions linked by a linear relationship. However, it is convenient in certain cases to be able to modify the order of emission of pulses, for technical reasons, or to reduce the risk of jamming. At reception, it is then necessary to restore the linearity of the relationship so that the bank of filters operates normally. What happens is simply that the order of the received signals is restored to accord with the order of the emitted pulses.

In the case in which a spectral analyser unit is being employed, such as a circuit for calculating the Fourrier transform, the system remains unmodified. The received signals are applied to the store 11 as before, that is to say in the order of their arrival; to restore the linearity of the frequency-position relationship, it is merely necessary to modify the order of picking off of the stored signals, by the computer 12. This is obtained for example by changing the indices of the signals to be picked off, in the computer programme.

Where it is a bank of analogue filters which is involved, it is necessary for the trains of signals applied to the filters to be presented in an order such that the pulses with which they correspond have frequencies and positions which are linked by a linear relationship.

In a first example, n received signals in a series of pulses can be distributed between n delay lines using an electronic switch synchronised with the switches K1 and K2.

The n outputs of the delay lines are then connected to the inputs of the filters bank. The delays of the lines are determined in accordance with the order of emission of the pulses.

In a final example, it is equally possible to utilise between the demodulating means and the filters bank, analogue-digital and digital-analogue converter circuits between which the signals are stored and then picked-off in a different order using switches synchronised with K1 and K2 for example.

The radar system described makes it possible to achieve a high resolution coupled with relatively simple processing of the video signal since the pass band of the circuits utilised is not necessarily wide.

The system can be employed to monitor distant and isolated objects (satellites, ships, etc . . .).

Surveillance is of course only possible in the direction of propagation of the waves. When used jointly, with a side-looking precision system and a dummy antenna, it is possible to produce a high-precision radar chart of a small region of space.

What is claimed is:

1. A radar system having a high range resolution comprising:
    means for transmitting a series of pulses whose carrier frequencies are distributed within a band B and whose time positions are associated with the frequencies in accordance with a linear relationship, said series of pulses being repeated with a given recurrence periodicity,
    means for receiving the echo signals from objects in space and for effecting demodulation using the corresponding waves which gave rise to them,
    filtering means having a band width substantially equal to the spectral width of the pulses, and
    a plurality of filters coupled to said filtering means for producing at different outputs different signals which correspond to separate objects in space.

2. A radar system having a high range resolution comprising:
    generating means for producing n waves of different frequencies, said frequencies being regularly distributed within a frequency band B,
    switching means having n positions for successively and cyclically select one of said waves with a given recurrence periodicity,
    chopping means for chopping a pulse of given duration from each wave, said duration corresponding to a pulse spectral width which is at least equal to $B/n$,
    transmitting means for transmitting said pulses in the space,
    receiving means for receiving the echo signals from objects in space,
    demodulating means coupled to said receiving means and said switching means for producing demodulated echo signals,
    filtering means connected to said demodulating means and having a band width which is substantially equal to the spectral width of the emitted pulses, and
    a bank of filters coupled to said filtering means for producing at different outputs different signals which correspond to separate objects in space.

3. A radar system having a high range resolution comprising:
    generating means for producing n waves of different frequencies, said frequencies being regularly distributed within a frequency band B,
    first switching means having n positions for successively and cyclically select one of said waves with a given recurrence periodicity,
    chopping means for chopping a pulse of given duration from each wave, said duration corresponding to a pulse spectral width which is at least equal to $B/n$,
    means for transmitting said pulses in the space,
    receiving means for receiving the echo signals from objects in space,
    second switching means having n positions, connected to said generating means, for successively and cyclically select one of said waves in synchronism with said first switch means but with a position offset which depends on the range of objects to be observed,
    demodulating means coupled to said receiving means and said second switch means for producing demodulated echo signals,
    filtering means connected to said demodulating means and having a band width which is substantially equal to the spectral width of the emitted pulses and,
    a bank of filters coupled to said filtering means for producing at different outputs different signals which correspond to separate objects in space.

4. A radar system as claimed in claim 3, further comprising a computer for determining the position offset of the second switch means with respect to the first one, on the basis of a signal which is a function of the range of the objects to be observed, and control means for controlling the first and second switch means with said position offset.

5. A radar system as claimed in claim 4 further comprising a range gate inserted between the filtering means and the bank of filters and a gate control circuit for controlling the operation of said range gate in response to a range signal which is a function of the range of the objects to be observed.

6. A radar system as claimed in claim 3, wherein said bank of filters is constituted by an $n$-channel digital device for computing the Fourrier transform of n successive demodulated echo signals, said device being associated with an input storage circuit for storing said echo signals and for delivering them together to said digital device and means for picking off the $n$ output signals of said device and for producing a series of $n$ digital signals which are representative of the appearance of a block of space.

7. A radar system as claimed in claim 3 further comprising compensating means for compensating the variation in propagation time of waves through the transmitting means in response to the variation in carrier frequency, said compensating means comprising coupling means between the transmitting and the receiving means for transmitting a series of pulses directly from the transmitting means to the receiving means during a zero range echo simulation, means for measuring the phase-shift between each emitted pulse and the corresponding received pulse, means for storing the series of phase-shift values which are measured during said simulation, and a phase-shaft operating circuit inserted between the filtering means and the bank of filters for substracting said stored phase-shift values to the phases of the demodulated echo signals respectively during the normal operation of the radar system.

8. A radar system as claimed in claim 7 further comprising a radial speed correction device coupled to the phase-shift operating circuit for correcting furthermore the phase-shifts operated by said circuit in response to a radial speed signal.

* * * * *